(12) United States Patent
Shim et al.

(10) Patent No.: US 10,903,884 B2
(45) Date of Patent: Jan. 26, 2021

(54) METHOD AND APPARATUS FOR COMBINING PLURALITY OF RADIO FREQUENCY SIGNALS

(71) Applicant: Samsung Electronics Co., Ltd., Suwon-si (KR)

(72) Inventors: Seijoon Shim, Suwon-si (KR); Joonho Cho, Seoul (KR); Hayoung Yang, Suwon-si (KR); Eunae Lee, Daegu (KR); Taejun Jang, Daegu (KR); Jonghwan Kim, Suwon-si (KR)

(73) Assignees: Samsung Electronics Co., Ltd., Suwon-si (KR); POSTECH Research and Business Development Foundation, Pohang-si (KR)

( * ) Notice: Subject to any disclaimer, the term of this patent is extended or adjusted under 35 U.S.C. 154(b) by 0 days.

(21) Appl. No.: 16/727,391

(22) Filed: Dec. 26, 2019

(65) Prior Publication Data

US 2020/0212979 A1 Jul. 2, 2020

(30) Foreign Application Priority Data

Dec. 27, 2018 (KR) ........................ 10-2018-0171138

(51) Int. Cl.
*H04L 1/02* (2006.01)
*H04B 7/06* (2006.01)
(Continued)

(52) U.S. Cl.
CPC ......... *H04B 7/0617* (2013.01); *H04B 7/0417* (2013.01); *H04B 7/0626* (2013.01);
(Continued)

(58) Field of Classification Search
CPC .. H04B 7/0632; H04B 17/336; H04B 7/0617; H04B 7/0413; H04L 1/0618; H04L 1/06; H04W 16/28
(Continued)

(56) References Cited

U.S. PATENT DOCUMENTS 10,028,275 B2   7/2018   Lyu
10,028,290 B2   7/2018   Jo et al.
(Continued)

FOREIGN PATENT DOCUMENTS

KR    10-2004-0065652 A    7/2004
WO    2016/045467 A1    3/2016

OTHER PUBLICATIONS

Yingliu Cui, "Robust radar waveform algorithm based on beam steering vector estimation", Acta Technica 61, No. 4A/2016, 123. 132, 2017 [Retrieved on: Mar. 6, 2020]. Retrieved from the Internet: <URL: https://www.semanticscholar.org/paper/Robust-radar-waveform-algorithm-based- on-beam-Cui/1ba856671d.
(Continued)

*Primary Examiner* — Khai Tran
(74) *Attorney, Agent, or Firm* — Jefferson IP Law, LLP

(57) ABSTRACT

A base station for transmitting and receiving signals in a wireless communication system is provided. The base station includes a transceiver, and at least one processor configured to obtain reception antenna weights for the base station including an array of a plurality of antennas, and transmission antenna weights for at least one user equipment (UE), convert signals received from the at least one UE through a plurality of reception paths, into beam-domain signals, based on the transmission antenna weights and the reception antenna weights, combine the converted beam-domain signals by applying predefined combining weights to the converted beam-domain signals, and obtain data from the combined signals.

16 Claims, 7 Drawing Sheets

(51) Int. Cl.
*H04L 5/00* (2006.01)
*H04L 27/26* (2006.01)
*H04B 7/0417* (2017.01)
*H04B 7/08* (2006.01)

(52) U.S. Cl.
CPC ......... *H04B 7/0634* (2013.01); *H04B 7/0691* (2013.01); *H04B 7/0857* (2013.01); *H04L 5/0048* (2013.01); *H04L 27/2636* (2013.01)

(58) Field of Classification Search
USPC ........ 375/267, 260, 130, 299, 316; 370/328; 342/372
See application file for complete search history.

(56) References Cited

U.S. PATENT DOCUMENTS

| | | | |
|---|---|---|---|
| 2004/0228420 A1 | 11/2004 | Chul | |
| 2005/0206564 A1 | 9/2005 | Mao et al. | |
| 2007/0109183 A1* | 5/2007 | Kimata | H04B 7/0619 342/354 |
| 2007/0142009 A1 | 6/2007 | Scarpa et al. | |
| 2011/0033005 A1* | 2/2011 | Hayase | H04B 7/0615 375/267 |
| 2013/0002488 A1* | 1/2013 | Wang | G01S 13/89 342/377 |

OTHER PUBLICATIONS

International Search Report dated Apr. 7, 2020, issued in International Patent Application No. PCT/KR2019/018405.

\* cited by examiner

METHOD AND APPARATUS FOR COMBINING PLURALITY OF RADIO FREQUENCY SIGNALS

CROSS-REFERENCE TO RELATED APPLICATION(S)

This application is based on and claims priority under 35 U.S.C. § 119(a) of a Korean patent application number 10-2018-0171138, filed on Dec. 27, 2018, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd. and 2) POSTECH Research and Business Development Foundation.

BACKGROUND

1. Field

The disclosure relates to a wireless communication system. More particularly, the disclosure relates to an apparatus for pre-combining a plurality of received signals, and a method of operating the apparatus.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. To achieve high data rates, implementation of 5G communication systems in an ultra-high frequency or millimeter-wave (mmWave) band (e.g., a 60-GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. To improve system networks for 5G communication systems, various technologies such as evolved small cells, advanced small cells, cloud radio access networks (cloud-RAN), ultra-dense networks, device-to-device (D2D) communication, wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required and, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, technologies related to sensor networks, M2M communication, and MTC are being implemented by using 5G communication technology including beamforming, MIMO, and array antennas. Application of a cloud RAN as the above-described big data processing technology may be an example of convergence of 5G communication technology and IoT technology.

A variety of services are providable due to the development of mobile communication systems as described above, and thus a method capable of appropriately providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for transmitting and receiving signals in a wireless communication system, by which a base station may convert signals received through a plurality of paths, to the beam domain and combine the converted signals and thus, may effectively reduce resources required for pre-combining.

Additional aspects will be set forth in part in the description which follows and, in part, will be apparent from the description, or may be learned by practice of the presented embodiments.

In accordance with an aspect of the disclosure, a base station for transmitting and receiving signals in a wireless communication system is provided. The base station includes a transceiver, and at least one processor configured to obtain reception antenna weights for the base station including an array of a plurality of antennas, obtain transmission antenna weights for at least one user equipment (UE), convert signals received from the at least one UE through a plurality of reception paths, into beam-domain signals, based on the transmission antenna weights and the reception antenna weights, combine the beam-domain signals by applying predefined combining weights to the converted beam-domain signals, and obtain data from the combined beam-domain signals.

The at least one processor may be further configured to obtain channel information of the plurality of reception paths through which the signals of the at least one UE are received, perform maximum ratio combining (MRC) on the signals received through the plurality of reception paths, based on the channel information, and convert signals obtained as a result of performing the MRC, into the beam-domain signals.

The at least one processor may be further configured to obtain channel information of the plurality of reception paths through which the signals of the at least one UE are received, perform MRC on the beam-domain signals, based on the channel information, and combine signals obtained as a result of performing the MRC, by applying the predefined combining weights to the signals.

The at least one processor may be further configured to convert the received signals into the beam-domain signals, based on a beam domain conversion matrix having a size of S×N and including vectors indicating characteristics of antennas of the base station and characteristics of antennas of the at least one UE, when a total number of antennas of the base station is N and a total number of antennas of the at least one UE is S, and the characteristics of the antennas of the base station and the characteristics of the antennas of the at least one UE may include information about at least one of a type, a location, a direction, or a beam pattern of the corresponding antennas.

The at least one processor may be further configured to provide information about a beam domain conversion matrix determined based on the reception antenna weights and the transmission antenna weights, to the at least one UE, and the signals received from the at least one UE may include data pre-coded based on the beam domain conversion matrix.

The reception antenna weights may include a matrix obtained based on a discrete Fourier transform (DFT) matrix having a size of N×N, when a total number of antennas of the base station is N, the transmission antenna weights may include matrices obtained based on DFT matrices each having a size corresponding to a number of antennas of each of the at least one UE, or a matrix obtained based on a DFT matrix having a size corresponding to a total number of antennas of the at least one UE, and the at least one processor may be further configured to convert the received signals into the beam-domain signals, based on a beam domain conversion matrix having a size of S×N and determined based on the reception antenna weights and the transmission antenna weights, when the total number of antennas of the at least one UE is S.

The predefined combining weights may include a combining weight matrix having a size of S×M and being preset to obtain M signals from S converted beam-domain signals, based on reception power of each signal, when a total number of antennas of the at least one UE is S.

In accordance with another aspect of the disclosure, a method, performed by a base station, of transmitting and receiving signals in a wireless communication system is provided. The method includes obtaining reception antenna weights for the base station including an array of a plurality of antennas, obtaining transmission antenna weights for at least one user equipment (UE), converting signals received from the at least one UE through a plurality of reception paths, into beam-domain signals, based on the transmission antenna weights and the reception antenna weights, combining the beam-domain signals by applying predefined combining weights to the beam-domain signals, and obtaining data from the combined beam-domain signals.

In accordance with another aspect of the disclosure, a user equipment (UE) for transmitting and receiving signals in a wireless communication system is provided. The UE includes a transceiver, and at least one processor operatively coupled to the transceiver and configured to receive, from a base station including an array of a plurality of antennas, information about a beam domain conversion matrix preset to convert signals received by the base station, into beam-domain signals, pre-code data, based on the information about the beam domain conversion matrix, and transmit signals including the pre-coded data, to the base station, wherein the beam domain conversion matrix is determined based on reception antenna weights of the base station and transmission antenna weights of the UE.

In accordance with another aspect of the disclosure, a method, performed by a user equipment (UE), of transmitting and receiving signals in a wireless communication system is provided. The method includes receiving, from a base station including an array of a plurality of antennas, information about a beam domain conversion matrix preset to convert signals received by the base station, into beam-domain signals, pre-coding data, based on the information about the beam domain conversion matrix, and transmitting signals including the pre-coded data, to the base station, wherein the beam domain conversion matrix is determined based on reception antenna weights of the base station and transmission antenna weights of the UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
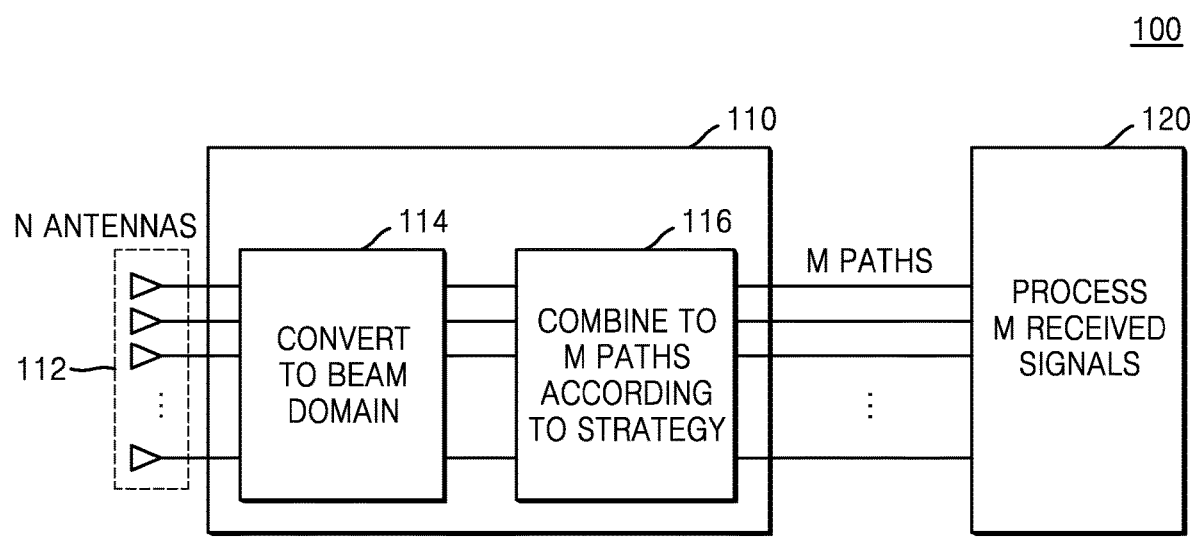
FIG. 1 is a conceptual diagram for describing a method, performed by a base station, of combining signals received through a plurality of reception paths, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

A technology by which a UE receives broadcast information from a base station in a wireless communication system will now be described. The disclosure relates to a communication method and system for convergence of 5$^{th}$ generation (5G) communication systems and Internet of things (IoT) technology to support higher data rates after 4$^{th}$ generation (4G) or beyond 4G communication systems. The disclosure is applicable to intelligent services (e.g., smart home, smart building, smart city, smart car or connected car, health care, digital education, retail, security, and safety services) based on 5G communication technology and IoT technology.

In the following description, terms and names defined in the 3rd generation partnership project long term evolution (3GPP LTE) standards may be used for convenience of explanation. However, the disclosure is not limited to those terms and names and is equally applicable to systems according to other standards.

Wireless communication systems providing voice-based services are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-pro of 3GPP, high rate packet data (HRPD) and ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink, and employs single carrier-frequency division multiple access (SC-FDMA) for an uplink. The uplink refers to a radio link for transmitting data or a control signal from a UE (or a MS) to a base station (BS) (e.g., an evolved Node B (eNB)), and the downlink refers to a radio link for transmitting data or a control signal from the base station to the UE. The above-described dual connectivity schemes generally distinguish between data or control information of different users by assigning time-frequency resources for the data or control information of the users not to overlap each other, i.e., to achieve orthogonality therebetween.

As post-LTE systems, 5G (or new radio (NR)) systems need to support services capable of reflecting and satisfying various requirements of users, service providers, etc. Services considered for the 5G systems include enhanced mobile broadband (eMBB), massive machine-type communication (mMTC), and ultra-reliability low-latency communication (URLLC) services.

Embodiments of the disclosure applicable to the above-described communication systems will now be described in detail with reference to the attached drawings.

FIG. 1 is a conceptual diagram for describing a method, performed by a base station 100, of combining signals received through a plurality of reception paths, according to an embodiment of the disclosure.

In general, wireless communication systems broadly use a transmission and reception technology using a plurality of antennas to improve reception performance. Currently, due to the development of antenna structures and multi-input multi-output (MIMO) technology, systems including a much larger number of antennas compared to the number of paths processable by a processor of a general base station are increasing.

In particular, when the number of antennas of a base station is increased to more than several tens as in full-dimension multi-input multi-output (FD-MIMO), a processor capable of processing reception paths of all antennas may not be easily implemented.

When the number of paths processable by a processor is less than the number of reception paths through antennas, a method of combining and digital-processing radio-frequency (RF) signals received by a plurality of antennas is generally used. This method is called pre-combining.

Technologies for pre-combining include eigenvalue decomposition (EVD) or singular value decomposition (SVD), and maximum ratio combining (MRC). EVD or SVD is a pre-combining method for selecting a plurality of high-power signals from among all channel signals received through antennas, by decomposing a matrix into eigenvalues and eigenvectors (or singular values and singular vectors). MRC is a method of increasing a signal-to-noise ratio (SNR) by determining weights for received signals, based on channel information and linearly combining the signals by using the weights.

According to the pre-combining method using EVD or SVD, because EVD or SVD is performed on channel information and a transmitter pre-codes and then transmits signals considering the channel information, pre-combining performance at a receiver may be increased. However, when channel complexity is increased, the amount of calculation required to perform EVD or SVD on the channel information is large and thus complexity of the transmitter or the receiver may be increased.

For example, in OFDM communication, EVD needs to be performed on each resource block (RB) and thus the amount of calculation is large.

According to the pre-combining method using MRC, although complexity is low because linear combining is used, pre-combining performance for selecting high-power signals is generally lower than that of EVD. For example, in an overloaded system where the number of paths to which received signals are pre-combined is less than the number of layers of a data stream obtained from the combined signals, MRC performance may be greatly reduced.

The base station 100 according to various embodiments of the disclosure may control complexity to a level similar to that of general MRC and increase pre-combining performance by converting, at block 114, received signals to the beam domain and combining, at block 116, the signals to M paths according to a strategy. In the disclosure, the conversion of the received signals to the beam domain refers to conversion of the received signals into beam-domain-based signals (or signals based on the beam domain, beam-domain signals, or signals of the beam domain).

Referring to FIG. 1, in a wireless communication system, when signals of a large number of reception paths, e.g., massive multiple-input and multiple-output (massive MIMO), are digital-processed, the amount of information to be digital-processed may be reduced by combining the reception paths. For example, the base station 100 may combine, at block 110, N reception paths into M paths (N≥M) and digital-process, at block 120, the combined M received (Rx) signals.

The base station 100 may convert, at block 114, signals received by the base station 100 through N antennas 112 from at least one UE, to the beam domain.

Before being converted, at block 114, to the beam domain, the signals received by the base station 100 through the N antennas 112 may pass through at least one module (not shown) including an RF receiver, a filter, a low noise amplifier (LNA), a down conversion module, and an analog-to-digital converter (ADC). The signals received through the at least one module from the at least one UE may be processed by the RF receiver, be down-converted to a base band, and then be converted into digital signals. However, the above-described at least one module is merely an example and another-type module for performing the above-described operations may be included in the base station 100.

The base station 100 may convert the received signals to the beam domain, based on transmission antenna weights and reception antenna weights. For example, the base station 100 may determine a beam domain conversion matrix for converting the received signals to the beam domain. The base station 100 may combine the signals converted to the beam domain, by applying predefined combining weights to the signals converted to the beam domain.

For example, to combine the N reception paths through which the signals are received from at least one UE, into M paths, the base station 100 may determine a matrix having a size of M×N and including combining weight vectors, based on channel information of the reception paths, the transmission antenna weights, the reception antenna weights, the number of reception paths, and the number of paths to be combined from the reception paths. The above-described matrix having a size of M×N may be a matrix obtained by multiplying the beam domain conversion matrix by a matrix including combining weight vectors. Methods of determining the beam domain conversion matrix and the combining weights will be described in detail below with reference to FIGS. 2 to 7.

The base station 100 may digital-process, at block 120, the M combined signals, combined at block 110, and obtain data from the combined signals. That is, the base station 100 may restore the data from the signals combined to the M paths, through digital signal processing.

Figure 2:
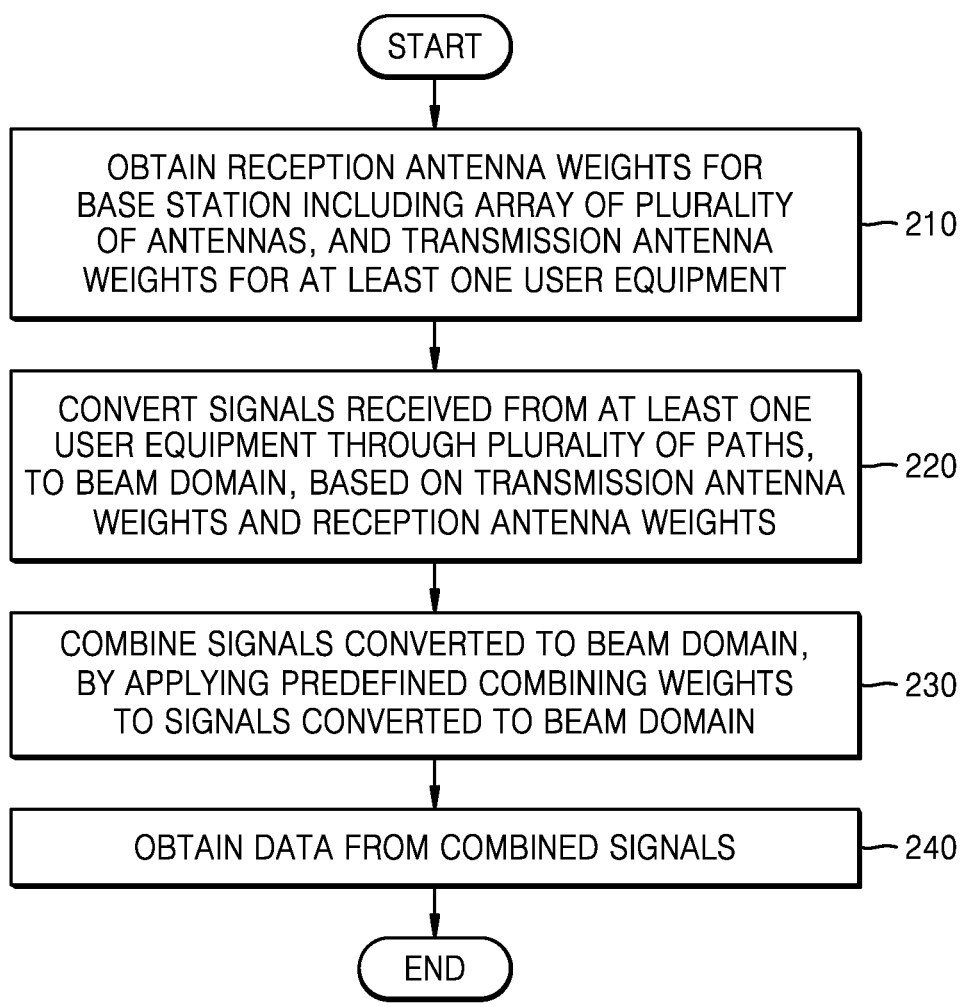
FIG. 2 is a flowchart for describing a method, performed by a base station, of transmitting and receiving signals, according to an embodiment of the disclosure.

FIG. 2 is a flowchart for describing a method, performed by a base station, of transmitting and receiving signals, according to an embodiment of the disclosure.

Referring to FIG. 2, in operation 210, the base station according to an embodiment of the disclosure may obtain reception antenna weights for the base station including an array of a plurality of antennas, and transmission antenna weights for at least one UE.

Antenna weights refer to weight vectors or a weight matrix determined based on characteristics of the antennas. The antenna weights may also be called pre-coding vectors, beamforming vectors, or beamforming weight vectors. The antenna weights may be determined based on the characteristics of the antennas in various ways. For example, the characteristics of the antennas used to determine the antenna weights may include information about at least one of a type, a location, a direction, or a beam pattern of the antennas. When the number of antennas is N, the antenna weights may include a matrix having a size of N×N. The antenna weights may be determined as a unit matrix or a (number of antennas)-point discrete Fourier transform (DFT) matrix.

In the disclosure, a receiver may refer to the base station. The reception antenna weights may refer to weight vectors or a weight matrix determined based on the characteristics of the antennas of the base station.

In the disclosure, a transmitter may refer to a UE. The transmission antenna weights may refer to weight vectors or a weight matrix determined based on characteristics of antennas of at least one UE.

According to an embodiment of the disclosure, the base station may obtain the transmission antenna weights from the at least one UE. The base station may store the transmission antenna weights obtained from the at least one UE, and convert received signals to the beam domain, based on the stored transmission antenna weights. When the base station does not obtain the transmission antenna weights of the UE for transmitting the signals, the base station may determine the transmission antenna weights as a DFT matrix having a certain size.

The base station according to an embodiment of the disclosure may obtain the transmission antenna weights, based on a random access signal transmitted from the at least one UE to the base station in an initial call access procedure. For example, the base station may obtain the transmission antenna weights from a signal received through a physical random access channel (PRACH).

In operation 220, the base station according to an embodiment of the disclosure may convert signals received from the at least one UE through a plurality of paths, to the beam domain, based on the transmission antenna weights and the reception antenna weights.

In the disclosure, the conversion of the received signals to the beam domain may refer to quantization of the received signals in terms of angles of the antennas.

The base station according to an embodiment of the disclosure may determine a beam domain conversion matrix, based on the reception antenna weights and the transmission antenna weights, and convert the received signals to the beam domain, based on the beam domain conversion matrix. The beam domain conversion matrix will be described in detail below with reference to FIGS. 3 and 4.

The base station according to an embodiment of the disclosure may provide information about the beam domain conversion matrix determined based on the reception antenna weights and the transmission antenna weights, to the at least one UE. The at least one UE may pre-code data to be transmitted to the base station, based on the beam domain conversion matrix in such a manner that the signals received by the base station from the UE may be easily converted to the beam domain. The base station may receive the signals including the data pre-coded based on the beam domain conversion matrix, from the at least one UE.

The base station according to various embodiments of the disclosure may uniform reception powers of antennas of a receiver to be non-uniform in the beam domain, considering signal transmission and reception directions corresponding to physical characteristics of a MIMO channel, by converting the signals received through the plurality of paths, to the beam domain, based on the reception antenna weights and the transmission antenna weights. Therefore, the base station may increase a probability of selecting and combining high-power signals by converting the received signals to the beam domain and then selecting M paths from among the paths of the converted signals.

When applied to an overloaded system where the number of paths to which received signals are pre-combined is less than the number of layers of a data stream obtained from the combined signals, the base station according to various embodiments of the disclosure may increase a sum-rate compared to a general pre-combining method using only MRC. However, a system to which the base station according to an embodiment of the disclosure is applicable is not limited to the overloaded system and the base station may also be applied to other systems such as an underloaded system.

In operation 230, the base station according to an embodiment of the disclosure may combine the signals converted to the beam domain, by applying predefined combining weights to the signals converted to the beam domain.

The combining weights refer to weights applied to combine N reception paths through which the signals are received from the UE, into M paths, that is, to select M paths from among the signals converted to the beam domain.

A strategy used when the base station according to an embodiment of the disclosure combines the N reception paths into the M paths may be determined in various ways. That is, the combining weights may be defined in various ways. For example, the base station may determine M columns by selecting a vector per UE from the beam domain conversion matrix or a matrix indicating the signals converted to the beam domain (e.g., a round robin method). Alternatively, the base station may calculate power, based on the beam domain conversion matrix or the matrix indicating the signals converted to the beam domain, and select M high-power columns. The base station may increase combining performance of the base station by selecting high-energy columns. However, the method, performed by the base station, of selecting the M paths is not limited to the above-described method and may be determined in various ways.

In operation 240, the base station according to an embodiment of the disclosure may obtain data from the combined signals. For example, the base station may obtain the data from the signals combined to the M paths, through digital signal processing.

The methods, performed by the base station, of converting the received signals to the beam domain and of combining the converted signals will now be described with reference to FIGS. 3 and 4.

Figure 3:
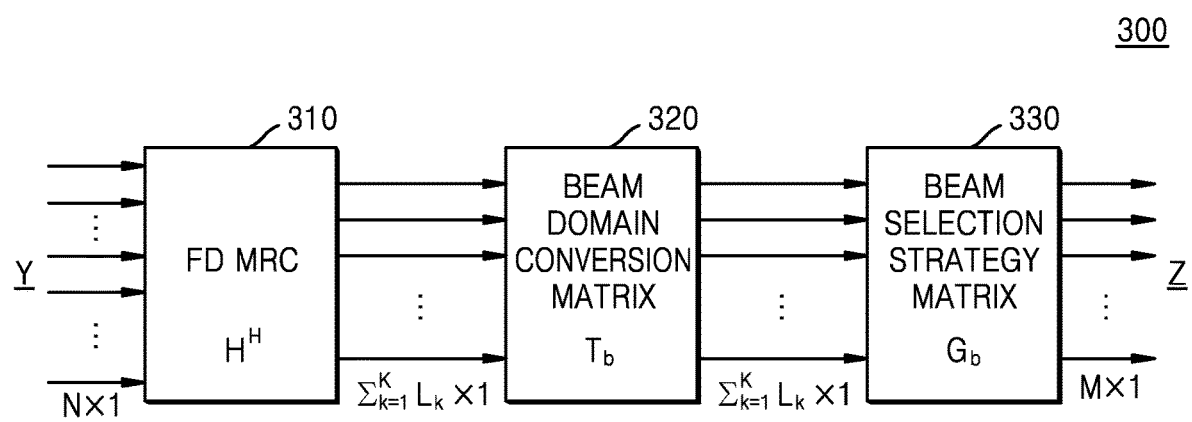
FIG. 3 is a schematic diagram for describing a method, performed by a base station, of combining N reception paths into M paths through beam domain conversion, according to an embodiment of the disclosure.

FIG. 3 is a schematic diagram for describing a method, performed by a base station, of combining N reception paths into M paths through beam domain conversion, according to an embodiment of the disclosure.

The base station according to an embodiment of the disclosure may obtain channel information of a plurality of reception paths through which signals of at least one UE are received, perform MRC on the signals received through the plurality of reception paths, based on the channel information, and convert signals obtained as a result of performing MRC, to the beam domain.

The channel information of the plurality of reception paths may be channel information of a reception path per antenna (or transmission channel) of the UE. For example, when the number of antennas (or transmission channels) of a UE-k is $L_k$, the channel information of the plurality of reception paths from the UE-k may be a vector having $1 \times L_k$ components. When the number of paths through which the base station receives signals from UEs is N and the number of UEs which transmit signals to the base station is K, the channel information of the plurality of reception paths may be a matrix H having a size of $N \times \Sigma_{k=1}^{K} L_k$. In the disclosure, the matrix H may refer to the channel information of the plurality of reception paths.

The base station according to an embodiment of the disclosure may obtain the channel information, based on a random access signal transmitted from the at least one UE to the base station in an initial call access procedure. For example, the base station from a signal received through a PRACH.

The base station according to an embodiment of the disclosure may obtain the channel information, based on a sounding reference signal (SRS) periodically received from the at least one UE. Alternatively, the base station may obtain the channel information, based on a demodulation reference signal (DMRS) received through a data channel between the at least one UE and the base station.

Referring to FIG. 3, the base station according to an embodiment of the disclosure may generate signals Z having M paths, by combining signals Y received from the at least one UE through N reception paths, through MRC and beam domain conversion. For example, the base station may generate the signals Z by combining the received signals Y as shown in Equation 1.

$$Z = Gb*Tb*HH*Y \qquad \text{Equation 1}$$

In Equation 1, $H^H$ is a conjugate transpose matrix of the channel information matrix H of the plurality of reception paths, $T_b$ is a beam domain conversion matrix, and $G_b$ is a beam selection strategy matrix.

When signals transmitted from at least one UE are denoted by X, channel information of reception paths is denoted by H, and noise is denoted by N, the signals Y received by the base station may be expressed as $Y=H*X+N$. The base station according to an embodiment of the disclosure may MRC-combine the received signals by applying weights determined based on the channel information, to the received signals. For example, the base station may MRC-combine the received signals Y by multiplying the received signals Y by the MRC weight matrix $H^H$, at block 310. When the number of paths through which the base station receives signals from UEs is N and the number of UEs which transmit signals to the base station is K, Y may be a vector or a matrix having N×1 components and $H^H$ may be a matrix having a size of $\Sigma_{k=1}^{K} L_k \times N$.

The base station according to an embodiment of the disclosure may convert the MRC-combined signals to the beam domain, based on at least one of transmission antenna weights or reception antenna weights. For example, the base station may convert the MRC-combined signals to the beam domain by multiplying $H^H*Y$ indicating the MRC-combined signals, by $T_b$, at block 320. $T_b$ may be a matrix having a size of $\Sigma_{k=1}^{K} L_k \times \Sigma_{k=1}^{K} L_k$. $T_b$ may be determined based on information about at least one of a type, a location, or a beam pattern of transmitter antennas, or a type, a location, or a beam pattern of receiver antennas.

The base station according to an embodiment of the disclosure may select the M paths according to a strategy from among the signals MRC-combined and converted to the beam domain. For example, the base station may select the M paths by multiplying $T_b*H^H*Y$ indicating the signals to which the MRC weight matrix and the beam domain conversion matrix are applied, by the beam selection strategy matrix $G_b$, at block 320. $G_b$ may be a matrix having a size of $M \times \Sigma_{k=1}^{K} L_k$, and be determined in various ways as described above in relation to operation 230 of FIG. 2.

The base station according to an embodiment of the disclosure may combine the signals received through the N reception paths, to the M paths by MRC-combining the received signals, converting the MRC-combined signals to the beam domain, and selecting the M paths, as described above. That is, the base station may combine the signals Y received through the N reception paths, to the M paths by multiplying the received signals Y by a matrix $G_b*T_b*H^H$ having a size of M×N.

The method, performed by the base station according to an embodiment of the disclosure, of MRC-combining the received signals in the beam domain is not limited to the method illustrated in FIG. 3. For example, the order in which the base station MRC-combines the received signals and converts the received signals to the beam domain may be determined in various ways. For example, the base station may convert the received signals to the beam domain and then MRC-combine the converted signals. The operation of MRC-combining the received signals and the operation of converting the received signals to the beam domain may not be performed separately and be performed together. The method, performed by the base station, of MRC-combining the received signals in the beam domain is not limited to the above-described example and may be determined in various ways.

Figure 4:
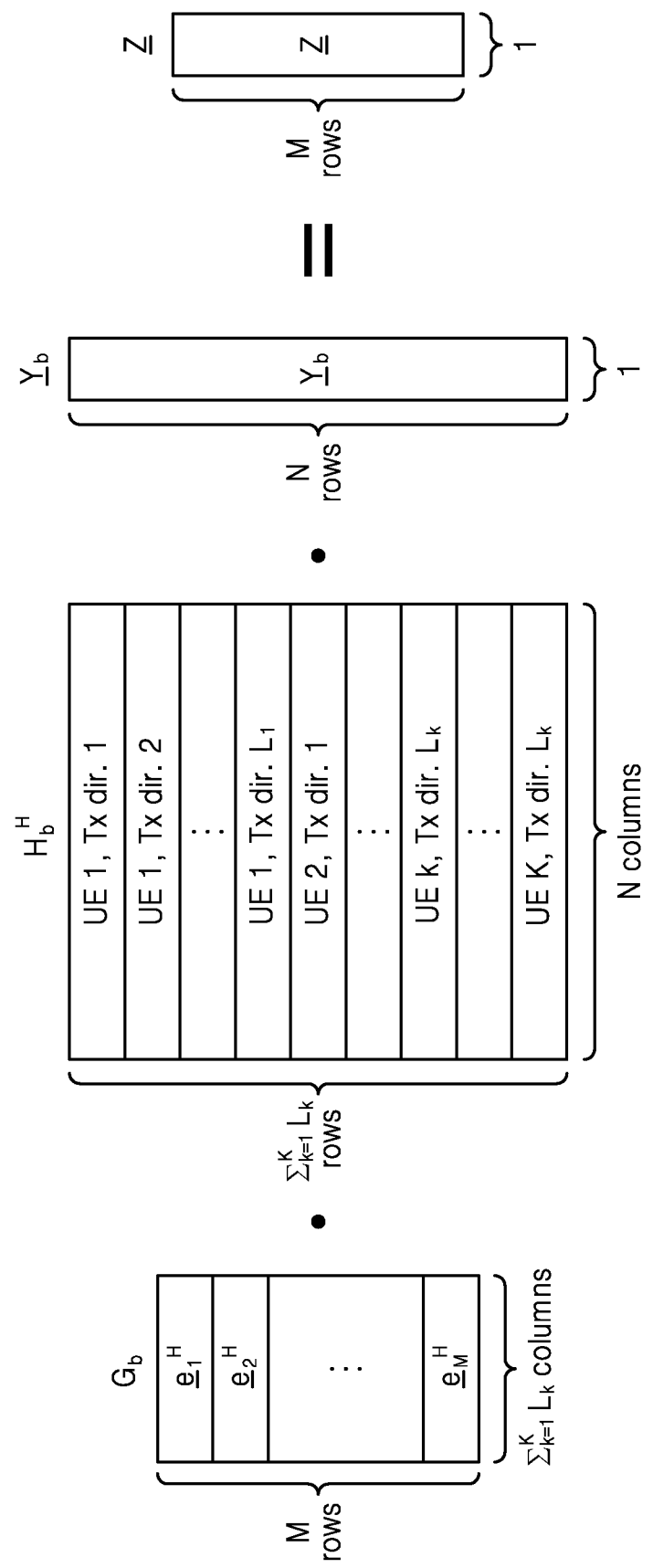
FIG. 4 is a schematic diagram for describing a method, performed by a base station, of combining reception paths, based on transmission antenna weights and reception antenna weights according to an embodiment of the disclosure.

FIG. 4 is a schematic diagram for describing a method, performed by a base station, of combining reception paths, based on transmission antenna weights and reception antenna weights according to an embodiment of the disclosure.

The base station according to an embodiment of the disclosure may obtain channel information of a plurality of reception paths through which signals of at least one UE are received, perform MRC on the signals converted to the beam domain, based on the channel information, and combine the signals received through the plurality of reception paths by applying predefined combining weights to signals obtained as a result of performing MRC. The method, performed by the base station, of obtaining the channel information may correspond to the method described above in relation to FIG. 3.

Referring to FIG. 4, the base station according to an embodiment of the disclosure may generate signals Z having M paths, by converting signals Y received from the at least one UE through N reception paths, into $Y_b$, and then combining the signals $Y_b$ through beam domain conversion and MRC. For example, the base station may generate the signals Z by combining the received signals Y as shown in Equation 2.

$$Z = G_b*H_b H*Y_b = G_b*H_b H*W_R*Y \quad \text{Equation 2}$$

In Equation 2, $Y_b$ is a matrix obtained by multiplying the received signals Y by reception antenna weights $W_R$ ($Y_b = W_R*Y$), $H_b^H$ is a conjugate transpose matrix of a beam domain channel information matrix $H_b$ obtained by converting a channel information matrix H of the plurality of reception paths to the beam domain, and $G_b$ is a beam selection strategy matrix.

The base station according to an embodiment of the disclosure may convert the received signals to the beam domain, based on the reception antenna weights. For example, the base station may generate the signals $Y_b$ obtained by converting the signals Y to the beam domain, by multiplying the received signals Y by the reception antenna weights $W_R$. The reception antenna weights $W_R$ may be determined based on information about at least one of a type, a location, or a beam pattern of receiver antennas, and be determined in various ways as described above in relation to operation 210 of FIG. 2. When the number of paths through which the base station receives signals from UEs is N, $W_R$ may be a matrix having a size of N×N.

The base station according to an embodiment of the disclosure may perform MRC in the beam domain by applying weights determined based on the channel information, transmission antenna weights, and the reception antenna weights, to the signals converted to the beam domain. For example, the base station may perform MRC in the beam domain by multiplying the signals $Y_b$ obtained by converting the received signals to the beam domain, by the beam domain MRC weight matrix $H_b^H$.

The base station may determine beam domain MRC weights by converting the channel information of the plurality of reception paths to the beam domain. For example, when the transmission antenna weights are denoted by $W_T$, the base station may determine the beam domain channel information matrix $H_b$ to be $H_b = W_R*H*W_T^H$. That is, the beam domain channel information matrix may be a product of the reception antenna weights, the channel information matrix, and a conjugate transpose matrix of a transmission antenna weight matrix. Therefore, the beam domain MRC weight matrix $H_b^H$ may be determined to be $H_b^H = W_T*H^H*W_R^H$.

A component of each row of the beam domain MRC weight matrix $H_b^H$ may be a vector including direction information of each antenna (or transmission channel) of each UE. For example, when the number of antennas (or transmission channels) of a UE-k is $L_k$, a $(\Sigma_{k=1}^{K_1-1} L_k + K_2)^{th}$ component of the beam domain MRC weight matrix $H_b^H$ may be a vector including direction information of a $K_2^{nd}$ antenna (or transmission channel) of the UE-$K_1$ (e.g., UE $K_1$, Tx dir. $K_2$).

Due to physical channel characteristics of a UE, each column of the beam domain channel information matrix $H_b$ corresponding to any one UE may have an energy level different from that of another column corresponding to the above-mentioned UE.

The transmission antenna weights $W_T$ may be determined based on information about at least one of a type, a location, or a beam pattern of transmitter antennas, and be determined in various ways as described above in relation to operation 210 of FIG. 2. When the number of antennas (or transmission channels) of the UE-k is $L_k$, $W_T$ may be a matrix having a size of $L_k \times \Sigma_{k=1}^{K} L_k \times \Sigma_{k=1}^{K} L_k$. The channel information H of the plurality of reception paths may be a matrix having a size of $N \times L_k$. Therefore, the beam domain MRC weight matrix $H_b^H$ may be a matrix having a size of $\Sigma_{k=1}^{K} L_k \times N$.

The transmission antenna weights $W_T$ and the reception antenna weights $W_R$ used when the base station according to an embodiment of the disclosure performs MRC by converting the received signals and the channel information matrix to the beam domain may be matrices generated based on a DFT matrix. The base station may control complexity to a level similar to that of general MRC by performing beam domain conversion and performing MRC in the beam domain by using a DFT matrix which is easily calculable and has a simple structure. For example, the complexity may be determined as shown in Table 1.

TABLE 1

| Technology | Complexity |
|---|---|
| EVD | $O(N^{2.373}) + O(N(\Sigma_{k=1}^{K} L_k)^2) + O(MN^2)$ |
| MRC | $O(MN(\Sigma_{k=1}^{K} L_k)) + \alpha$ |
| Beam Domain MRC | $O(MN(\Sigma_{k=1}^{K} L_k)^2) + \alpha$ |

Herein, assuming $N \gg (\Sigma_{k=1}^{K} L_k) \geq M$, the complexity of the MRC method of the base station in the beam domain may be similar to that of general MRC and be lower than that of EVD.

When signals transmitted from at least one UE are denoted by X, channel information of reception paths is denoted by H, and noise is denoted by N, the signals Y received by the base station may be expressed as $Y = H*X + N$. The signals $Y_b$ converted to the beam domain by the base station may be determined as shown in Equation 3.

$$Yb = Hb*Xb + Nb \qquad \text{Equation 3}$$

In Equation 3, $Y_b = W_R*Y$, $H_b = W_R*H*W_T^H$, $Xb = W_T*X$, and $N_b = W_R*N$.

According to an embodiment of the disclosure, a beam domain conversion matrix may be a matrix obtained by multiplying the beam domain MRC weight matrix $H_b^H$ by the reception antenna weight matrix $W_R$. That is, the beam domain conversion matrix may refer to $H_b^H*W_R = W_T*H^H*W_R^H*W_R$.

When $W_R^H*W_R$ is a unit matrix, the beam domain conversion matrix may be $H_b^H*W_R = W_T*H^H*W_R^H*W_R = W_T*H^H$, and be of the same form as $T_b*H^H$ described above in relation to FIG. 3. That is, when $W_R^H*W_R$ is the unit matrix, the beam domain conversion matrix $T_b$ described above in relation to FIG. 3 may be the transmission antenna weight matrix $W_T$.

The base station may change uniform reception powers of antennas of a receiver to be non-uniform in the beam domain, considering signal transmission and reception directions corresponding to physical characteristics of a MIMO channel, by applying the beam domain conversion matrix determined based on the reception antenna weights and the transmission antenna weights, to the received signals. Therefore, the base station may increase a probability of selecting and combining high-power signals by selecting M paths from among the signals converted to the time domain and MRC-combined.

The base station according to an embodiment of the disclosure may select the M paths by applying predefined combining weights according to a strategy to the signals MRC-combined and converted to the beam domain. For example, the base station may select the M paths by multiplying the signals $H_b^H*W_R*Y$ to which the beam domain conversion matrix is applied, by the beam selection strategy matrix $G_b$. $G_b$ may be a matrix having a size of $M \times \Sigma_{k=1}^{K} L_k$ and, for example, each of components $e_1^H, e_2^H, \ldots,$ and $e_M^H$ of the beam selection strategy matrix $G_b$ may be a standard basis having a length of $\Sigma_{k=1}^{K} L_k$.

The beam selection strategy matrix $G_b$ may be determined in various ways as described above in relation to operation 230 of FIG. 2. For example, the base station may select M high-power reception paths from among the N reception paths by calculating and aligning $\text{diag}(H_b^H*H_b)$ values, selecting M highest values from among the aligned values, and allocating the M selected values to components $e_1, e_2, \ldots,$ and $e_M$ of the beam selection strategy matrix $G_b$. Alternatively, the base station may determine the beam selection strategy matrix $G_b$ in such a manner that M columns are determined by selecting a column per UE from a matrix indicating the signals converted to the beam domain, i.e., a matrix indicating the signals to which the beam domain conversion matrix is applied (e.g., a round robin method).

The base station according to an embodiment of the disclosure may combine the signals received through the N reception paths, to the M paths by MRC-combining the received signals, converting the MRC-combined signals to the beam domain, and selecting the M paths, as described above. That is, the base station may combine the signals Y received through the N reception paths, to the M paths by multiplying the received signals Y by a matrix $G_b*T_b*H^H$ having a size of $M \times N$.

The base station may increase a probability of combining high-power signals by reflecting physical characteristics of a MIMO channel without greatly increasing complexity, by combining the received signals according to various embodiments of the disclosure. That is, the base station may control complexity to a level similar to that of general MRC and increase sum-rate performance.

Figure 5:
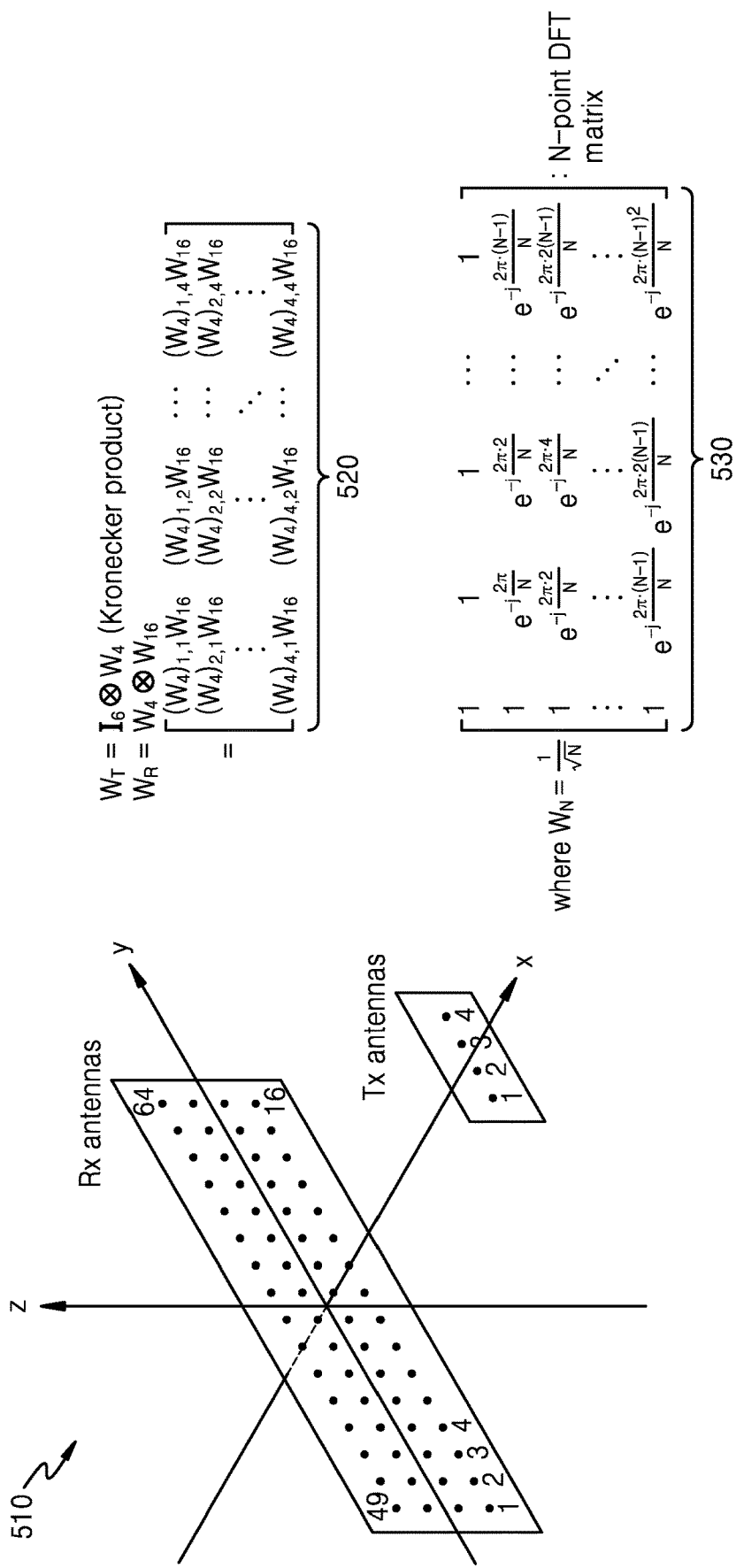
FIG. 5 is a schematic diagram for describing a transmission antenna weight matrix and a reception antenna weight matrix according to an embodiment of the disclosure.

FIG. 5 is a schematic diagram for describing a transmission antenna weight matrix and a reception antenna weight matrix according to an embodiment of the disclosure.

Transmission antenna weights $W_T$ and reception antenna weights $W_R$ used when a base station according to an embodiment of the disclosure converts received signals to the beam domain may be matrices determined based on a DFT matrix. For example, $W_T$ and $W_R$ may be determined based on an N-point DFT matrix 530. Herein, N denotes the number of antennas or the number of transmission and reception channels.

Referring to FIG. 5, for example, when the number of transmitter antennas of a UE is 4 and the number of receiver antennas of the base station is 64 as indicated by reference numeral 510 of FIG. 5, $W_T$ may be determined as a Kronecker product of a unit matrix $\mathbf{1}_6$ having a size of 6 and a 4-point DFT matrix, and $W_R$ may be determined as a Kronecker product of a 4-point DFT matrix and a 16-point DFT matrix, as illustrated by elements 520 and 530. When the base station may not obtain antenna information of the UE, the base station may assume the transmission antenna weights $W_T$ as a (number of transmitter antennas)-point DFT matrix.

However, the method described above in relation to FIG. 5 is merely an example, and the method, performed by the base station, of determining the transmission antenna weights $W_T$ and the reception antenna weights $W_R$ is not limited to the above-described example and may be determined in various ways.

Figure 6:
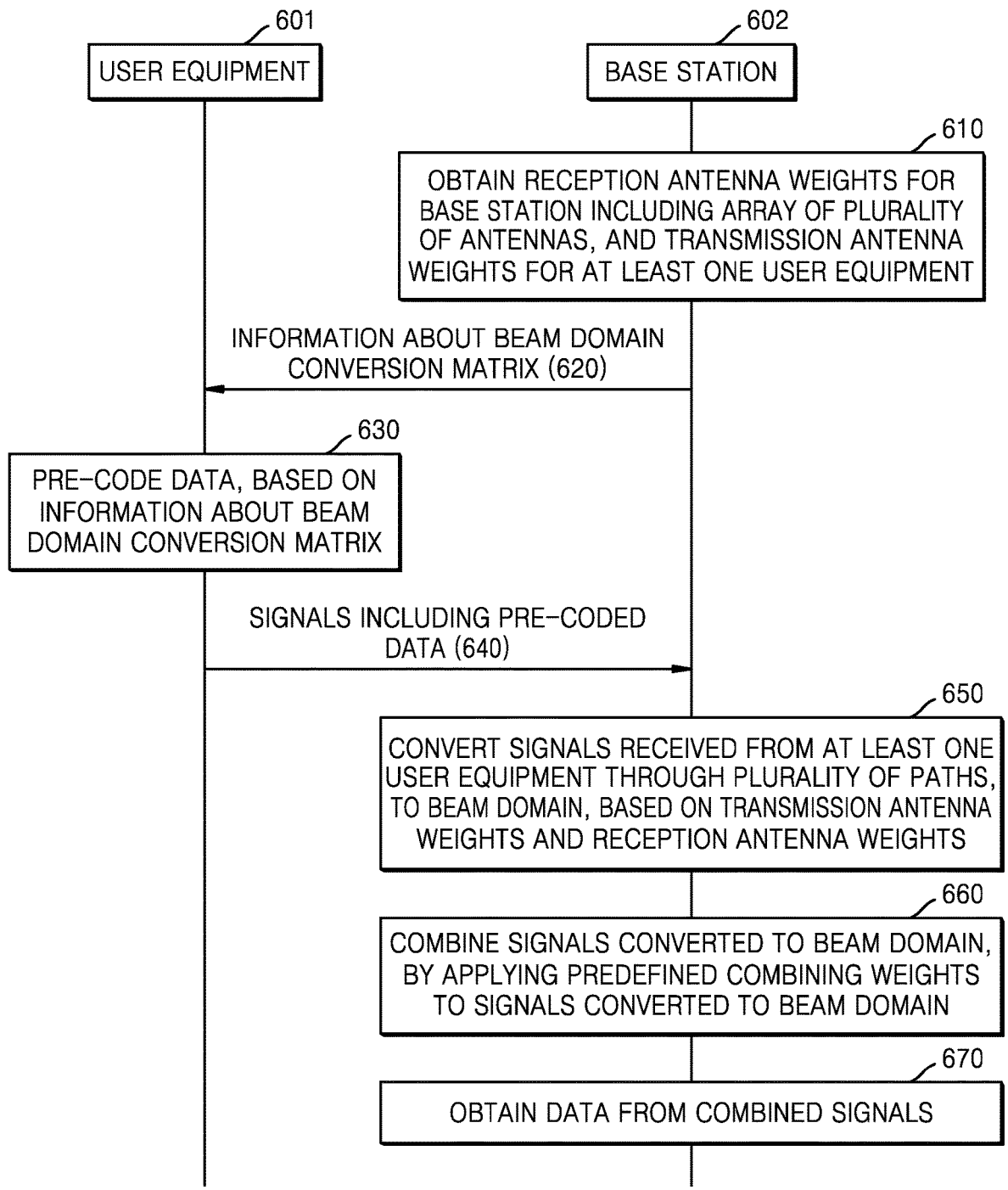
FIG. 6 is a schematic diagram for describing a method, performed by a base station, of transmitting and receiving signals to and from a user equipment (UE), according to an embodiment of the disclosure.

FIG. 6 is a schematic diagram for describing a method, performed by a base station 602, of transmitting and receiving signals to and from a UE 601, according to an embodiment of the disclosure.

The descriptions provided above in relation to FIG. 2 will not be repeated in relation to FIG. 6.

Referring to FIG. 6, in operation 610, the base station 602 may obtain reception antenna weights for the base station 602 including an array of a plurality of antennas, and transmission antenna weights for at least one UE 601. A detailed description of operation 610 may correspond to that provided above in relation to operation 210 of FIG. 2.

In operation 620, the base station 602 may transmit information about a beam domain conversion matrix to the UE 601. The base station 602 may determine the beam domain conversion matrix, based on the reception antenna weights and the transmission antenna weights. The beam domain conversion matrix may be determined using any one of the methods described above in relation to FIGS. 2 to 4.

When the beam domain conversion matrix needs to be updated, the base station 602 may transmit the information about the beam domain conversion matrix to the UE 601. For example, when the base station 602 does not know characteristics of antennas of the UE 601, characteristics of the antennas of the base station 602 are changed, or a channel status is changed by more than a preset threshold range, the base station 602 may transmit the information about the beam domain conversion matrix to the UE 601.

In operation 630, the UE 601 may pre-code data, based on the information about the beam domain conversion matrix. The UE 601 may pre-code the data to be transmitted to the base station 602, based on the beam domain conversion matrix in such a manner that signals received by the base station 602 from the UE 601 may be easily converted to the beam domain.

The UE 601 may store the information about the beam domain conversion matrix, which is received from the base station 602. When the information about the beam domain conversion matrix is not received from the base station 602, the UE 601 may pre-code the data, based on information about a beam domain conversion matrix, which is stored in the UE 601.

In operation 640, the UE 601 may transmit signals including the pre-coded data, to the base station 602. The signals transmitted from the UE 601 to the base station 602 may include control signals and/or data signals. The control or data signals transmitted from the UE 601 may be received through N reception paths and be combined to M paths by the base station 602.

In operation 650, the base station 602 may convert the signals received from the at least one UE 601 through a plurality of paths, to the beam domain, based on the transmission antenna weights and the reception antenna weights. A detailed description of operation 650 may correspond to that provided above in relation to operation 220 of FIG. 2.

In operation 660, the base station 602 may combine the signals converted to the beam domain, by applying predefined combining weights to the signals converted to the beam domain. A detailed description of operation 660 may correspond to that provided above in relation to operation 230 of FIG. 2.

In operation 670, the base station 602 may obtain data from the combined signals. A detailed description of operation 670 may correspond to that provided above in relation to operation 240 of FIG. 2.

Figure 7:
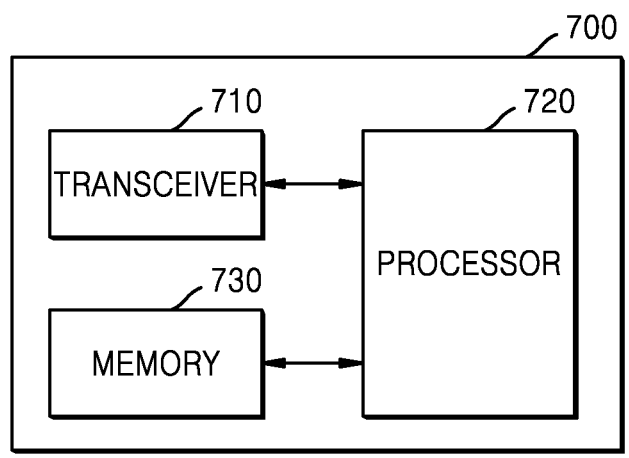
FIG. 7 is a block diagram of a base station according to an embodiment of the disclosure.

FIG. 7 is a block diagram of a base station 700 according to an embodiment of the disclosure.

Referring to FIG. 7, the base station 700 may include a transceiver 710, at least one processor 720, and a memory 730. The transceiver 710, the at least one processor 720, and the memory 730 may operate based on the signal combining method of the base station 700, which is proposed according to the afore-described embodiments of the disclosure. However, the elements of the base station 700 according to an embodiment of the disclosure are not limited to the above-mentioned examples. According to another embodiment of the disclosure, the base station 700 may include a larger or smaller number of elements compared to the above-mentioned elements. In a particular case, the transceiver 710, the at least one processor 720, and the memory 730 may be implemented in the form of a single chip.

The transceiver 710 may transmit and receive signals to and from at least one UE. The signals may include control information and data. To this end, the transceiver 710 may include an RF transmitter for up-converting a frequency of and amplifying signals to be transmitted, and an RF receiver for low-noise-amplifying and down-converting a frequency of received signals. However, the RF transmitter and the RF receiver are merely examples and the elements of the transceiver 710 are not limited thereto.

The transceiver 710 may receive signals through radio channels and output the signals to the at least one processor 720, and transmit signals output from the at least one processor 720, through radio channels. For example, the transceiver 710 may transmit signals received from at least one UE through N reception paths, by using M paths.

The at least one processor 720 may control a series of procedures to operate the base station 700 according to the afore-described embodiments of the disclosure. For example, the at least one processor 720 may perform at least one of the signal transmission and reception methods according to the afore-described embodiments of the disclosure. The at least one processor 720 may include at least one processor.

The at least one processor 720 according to an embodiment of the disclosure may obtain reception antenna weights for the base station 700 including an array of a plurality of antennas, and transmission antenna weights for at least one UE, convert signals received from the at least one UE through a plurality of reception paths, into beam-domain signals, based on the transmission antenna weights and the reception antenna weights, combine the converted beam-domain signals by applying predefined combining weights to the converted beam-domain signals, and obtain data from the combined signals.

The at least one processor 720 according to an embodiment of the disclosure may obtain channel information of the plurality of reception paths through which the signals of the at least one UE are received, perform MRC on the signals received through the plurality of reception paths, based on the channel information, and convert signals obtained as a result of performing MRC, into the beam-domain signals.

The at least one processor 720 according to an embodiment of the disclosure may obtain channel information of the plurality of reception paths through which the signals of the at least one UE are received, perform MRC on the converted beam-domain signals, based on the channel information, and combine signals obtained as a result of performing MRC, by applying the predefined combining weights to the signals.

The at least one processor 720 according to an embodiment of the disclosure may convert the received signals into the beam-domain signals, based on a beam domain conversion matrix having a size of S×N and including vectors indicating characteristics of antennas of the base station 700 and characteristics of antennas of the at least one UE, when the number of antennas of the base station 700 is N and a total number of antennas of the at least one UE is S, and the characteristics of the antennas may include information about at least one of a type, a location, a direction, or a beam pattern of the antennas.

The at least one processor 720 according to an embodiment of the disclosure may provide information about a beam domain conversion matrix determined based on the reception antenna weights and the transmission antenna weights, to the at least one UE, and the signals received from the at least one UE may include data pre-coded based on the beam domain conversion matrix.

According to an embodiment of the disclosure, the reception antenna weights may include a matrix obtained based on a DFT matrix having a size of N×N, when the number of antennas of the base station 700 is N, the transmission antenna weights may include matrices obtained based on DFT matrices each having a size corresponding to the number of antennas of each of the at least one UE, or a matrix obtained based on a DFT matrix having a size corresponding to a total number of antennas of the at least one UE, and the at least one processor 720 may convert the received signals into the beam-domain signals, based on a beam domain conversion matrix having a size of S×N and determined based on the reception antenna weights and the transmission antenna weights, when the total number of antennas of the at least one UE is S.

According to an embodiment of the disclosure, the predefined combining weights may include a combining weight matrix having a size of S×M and being preset to obtain M signals from S converted beam-domain signals, based on reception power of each signal, when a total number of antennas of the at least one UE is S.

The memory 730 may store control information or data included in the signals obtained by the base station 700, and include a space for storing data required for and generated in control operations of the at least one processor 720. For example, the memory 730 may store transmission antenna weight information and reception antenna weight information preset to determine the combining weights. The memory 730 may also store information about the determined combining weights.

The memory 730 may be configured in various forms, e.g., read-only memory (ROM) or/and random-access memory (RAM) or/and a hard disk or/and a compact disc-ROM (CD-ROM) or/and a digital versatile disc (DVD).

A UE according to an embodiment of the disclosure may also be configured as illustrated in the block diagram of FIG. 7. For example, the UE may include a transceiver, a processor, and a memory.

According to an embodiment of the disclosure, the processor included in the UE may receive, from a base station including an array of a plurality of antennas, information about a beam domain conversion matrix preset to convert signals received by the base station, into beam-domain signals, pre-code data, based on the information about the beam domain conversion matrix, and transmit signals including the pre-coded data, to the base station. The beam domain conversion matrix may be determined based on reception antenna weights of the base station and transmission antenna weights of the UE.

It should be understood that the embodiments of the disclosure described herein should be considered in a descriptive sense only and not for purposes of limitation.

That is, it will be understood by one of ordinary skill in the art that various changes in form and details may be made in the embodiments of the disclosure without departing from the scope of the disclosure. The embodiments of the disclosure are divided for convenience of explanation and may operate in combination as necessary. For example, a base station and a UE may operate according to a combination of parts of the embodiments of the disclosure.

An apparatus according to the afore-described embodiments of the disclosure may include a processor, a memory storing and executing program data, a permanent storage such as a disk drive, a communication port communicating with an external device, and a user interface device such as a touch panel, keys, or buttons.

A method of operating the apparatus, according to the afore-described embodiments of the disclosure, may be implemented in the form of program commands that can be executed through various computer means, and may be recorded on a computer-readable recording medium. The computer-readable recording medium may store program commands, data files, data structures, or combinations thereof. The program commands recorded on the computer-readable recording medium may be those specially designed and constructed for the purposes of the disclosure, or those well-known and available to one of ordinary skill in the art of computer software. The computer-readable recording medium may be included in a computer program product.

Examples of the computer-readable recording medium include magnetic media (e.g., hard disks, floppy disks, and magnetic tapes), optical media (e.g., CD-ROMs or DVDs), magneto-optical media (e.g., floptical disks), and hardware devices (e.g., ROMs, RAMs, and flash memories) that are specially configured to store and execute program commands. Examples of the program commands include both machine code produced by a compiler, and high-level language code that may be executed by the computer using an interpreter.

The embodiments of the disclosure may be described in terms of functional blocks and various processing operations. Such functional blocks may be implemented by any number of hardware and/or software components configured to perform specified functions. For example, the embodiments of the disclosure may employ integrated circuit components, e.g., memory elements, processing elements, logic elements, and look-up tables, which may carry out a variety of functions under the control of one or more microprocessors or other control devices. Similarly, where the elements of the embodiments of the disclosure are implemented using software programming or software elements, the embodiments of the disclosure may be implemented with any programming or scripting language such as C, C++, Java, or assembler, with the various algorithms being implemented with any combination of data structures, processes, routines or other programming elements. Functional aspects may be implemented using algorithms executed by one or more processors. Furthermore, the embodiments of the disclosure may employ any number of known techniques for electronic setup, signal processing, and/or data processing.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a base station, of transmitting and receiving signals in a wireless communication system, the method comprising:
   obtaining reception antenna weights for the base station comprising an array of a plurality of antennas;
   obtaining transmission antenna weights for at least one user equipment (UE);
   converting signals received from the at least one UE through a plurality of reception paths, into beam-domain signals, based on the transmission antenna weights and the reception antenna weights;
   combining the beam-domain signals by applying predefined combining weights to the beam-domain signals; and
   obtaining data from the combined beam-domain signals.

2. The method of claim 1, wherein the converting of the received signals into the beam-domain signals comprises:
   obtaining channel information of the plurality of reception paths;
   performing maximum ratio combining (MRC) on the received signals, based on the channel information; and
   converting signals obtained as a result of performing the MRC, into the beam-domain signals.

3. The method of claim 1, wherein the combining of the beam-domain signals comprises:
   obtaining channel information of the plurality of reception paths;
   performing MRC on the beam-domain signals, based on the channel information; and
   combining signals obtained as a result of performing the MRC by applying the predefined combining weights to the signals obtained as a result of performing the MRC.

4. The method of claim 1,
   wherein the converting of the received signals into the beam-domain signals comprises converting the received signals into the beam-domain signals, based on a beam domain conversion matrix having a size of S×N and comprising vectors indicating characteristics of antennas of the base station and characteristics of antennas of the at least one UE, when a total number of antennas of the base station is N and a total number of antennas of the at least one UE is S, and
   wherein the characteristics of the antennas of the base station and the characteristics of the antennas of the at least one UE comprise information about at least one of a type, a location, a direction, or a beam pattern of the corresponding antennas.

5. The method of claim 1, further comprising:
   providing information about a beam domain conversion matrix determined based on the reception antenna weights and the transmission antenna weights, to the at least one UE,
   wherein the signals received from the at least one UE comprise data pre-coded based on the beam domain conversion matrix.

6. The method of claim 1,
   wherein the reception antenna weights comprise a matrix obtained based on a discrete Fourier transform (DFT) matrix having a size of N×N, when a total number of antennas of the base station is N,
   wherein the transmission antenna weights comprise matrices obtained based on DFT matrices each having a size corresponding to a number of antennas of each of the at least one UE, or a matrix obtained based on a DFT matrix having a size corresponding to a total number of antennas of the at least one UE, and
   wherein the converting of the received signals into the beam-domain signals comprises converting the received signals into the beam-domain signals, based on a beam domain conversion matrix having a size of S×N and determined based on the reception antenna weights and the transmission antenna weights, when the total number of antennas of the at least one UE is S.

7. The method of claim 1, wherein the predefined combining weights comprise a combining weight matrix having a size of S×M and being preset to obtain M signals from S converted beam-domain signals, based on reception power of each signal, when a total number of antennas of the at least one UE is S.

8. A method, performed by a user equipment (UE), of transmitting and receiving signals in a wireless communication system, the method comprising:
   receiving, from a base station comprising an array of a plurality of antennas, information about a beam domain conversion matrix preset to convert signals received by the base station, into beam-domain signals;
   pre-coding data, based on the information about the beam domain conversion matrix; and
   transmitting signals comprising the pre-coded data, to the base station,
   wherein the beam domain conversion matrix is determined based on reception antenna weights of the base station and transmission antenna weights of the UE.

9. A base station for transmitting and receiving signals in a wireless communication system, the base station comprising:
   a transceiver; and
   at least one processor operatively coupled to the transceiver and configured to:
      obtain reception antenna weights for the base station comprising an array of a plurality of antennas,
      obtain transmission antenna weights for at least one user equipment (UE),
      convert signals received from the at least one UE through a plurality of reception paths, into beam-domain signals, based on the transmission antenna weights and the reception antenna weights,
      combine the beam-domain signals by applying predefined combining weights to the beam-domain signals, and
      obtain data from the combined beam-domain signals.

10. The base station of claim 9, wherein the at least one processor is further configured to:
   obtain channel information of the plurality of reception paths;
   perform maximum ratio combining (MRC) on the received signals, based on the channel information; and
   convert signals obtained as a result of performing the MRC, into the beam-domain signals.

11. The base station of claim 9, wherein the at least one processor is further configured to:
   obtain channel information of the plurality of reception paths;
   perform MRC on the beam-domain signals, based on the channel information; and
   combine signals obtained as a result of performing the MRC, by applying the predefined combining weights to the signals obtained as a result of performing the MRC.

12. The base station of claim 9,
wherein the at least one processor is further configured to convert the received signals into the beam-domain signals, based on a beam domain conversion matrix having a size of S×N and comprising vectors indicating characteristics of antennas of the base station and characteristics of antennas of the at least one UE, when a total number of antennas of the base station is N and a total number of antennas of the at least one UE is S, and
wherein the characteristics of the antennas of the base station and the characteristics of the antennas of the at least one UE comprise information about at least one of a type, a location, a direction, or a beam pattern of the corresponding antennas.

13. The base station of claim 9,
wherein the at least one processor is further configured to provide information about a beam domain conversion matrix determined based on the reception antenna weights and the transmission antenna weights, to the at least one UE, and
wherein the signals received from the at least one UE comprise data pre-coded based on the beam domain conversion matrix.

14. The base station of claim 9,
wherein the reception antenna weights comprise a matrix obtained based on a discrete Fourier transform (DFT) matrix having a size of N×N, when a total number of antennas of the base station is N,
wherein the transmission antenna weights comprise matrices obtained based on DFT matrices each having a size corresponding to a number of antennas of each of the at least one UE, or a matrix obtained based on a DFT matrix having a size corresponding to a total number of antennas of the at least one UE, and
wherein the at least one processor is further configured to convert the received signals into the beam-domain signals, based on a beam domain conversion matrix having a size of S×N and determined based on the reception antenna weights and the transmission antenna weights, when the total number of antennas of the at least one UE is S.

15. The base station of claim 9, wherein the predefined combining weights comprise a combining weight matrix having a size of S×M and being preset to obtain M signals from S converted beam-domain signals, based on reception power of each signal, when a total number of antennas of the at least one UE is S.

16. A user equipment (UE) for transmitting and receiving signals in a wireless communication system, the UE comprising:
a transceiver; and
at least one processor operatively coupled to the transceiver and configured to:
receive, from a base station comprising an array of a plurality of antennas, information about a beam domain conversion matrix preset to convert signals received by the base station, into beam-domain signals,
pre-code data, based on the information about the beam domain conversion matrix, and
transmit signals comprising the pre-coded data, to the base station,
wherein the beam domain conversion matrix is determined based on reception antenna weights of the base station and transmission antenna weights of the UE.

* * * * *